(12) United States Patent
McCabe

(10) Patent No.: US 6,830,766 B2
(45) Date of Patent: Dec. 14, 2004

(54) HIGH PROTEIN FOODSTUFF

(76) Inventor: David J. McCabe, 14218 Joel Ct., Largo, FL (US) 33774

( * ) Notice: Subject to any disclaimer, the term of this patent is extended or adjusted under 35 U.S.C. 154(b) by 160 days.

(21) Appl. No.: 10/150,263

(22) Filed: May 18, 2002

(65) Prior Publication Data

US 2003/0170347 A1 Sep. 11, 2003

Related U.S. Application Data

(63) Continuation-in-part of application No. 10/094,517, filed on Mar. 8, 2002.

(51) Int. Cl.⁷ .................................................. A23J 1/00
(52) U.S. Cl. .......................... 426/89; 426/93; 426/302; 426/306; 426/656
(58) Field of Search ............................ 426/656, 89, 93, 426/302, 306

(56) References Cited

U.S. PATENT DOCUMENTS

| 4,152,463 A | * | 5/1979 | Hayward et al. | ............ 426/289 |
| 4,673,578 A | * | 6/1987 | Becker et al. | ................ 426/93 |
| 5,389,395 A | * | 2/1995 | Joseph et al. | .................. 426/72 |
| 6,432,457 B1 | * | 8/2002 | Jones | ............................. 426/2 |
| 6,569,445 B2 | * | 5/2003 | Manning et al. | ............ 424/439 |
| 6,592,915 B1 | * | 7/2003 | Froseth et al. | ................ 426/93 |
| 2002/0034574 A1 | * | 3/2002 | Prosise et al. | .............. 426/560 |
| 2002/0168448 A1 | * | 11/2002 | Mody | ........................... 426/74 |
| 2003/0108594 A1 | * | 6/2003 | Manning et al. | ............ 424/439 |
| 2003/0113434 A1 | * | 6/2003 | Marsland | .................... 426/656 |

* cited by examiner

*Primary Examiner*—Anthony Weier
(74) *Attorney, Agent, or Firm*—Heslin Rothenberg Farley & Mesiti P.C.

(57) ABSTRACT

The present invention is a high-protein foodstuff that includes at least two layers wherein at least one of the layers includes at least 25% of protein and wherein the high-protein foodstuff may further include of a high protein coating or low protein coating. The present invention is also directed to methods for making the high protein foodstuff, optionally with a high protein coating or low protein coating.

53 Claims, No Drawings

HIGH PROTEIN FOODSTUFF

CROSS REFERENCE TO RELATED APPLICATION

This application is a continuation-in-part of U.S. patent application Ser. No. 10/094,517 filed Mar. 8, 2002, the entire disclosure of which is incorporated herein by reference.

FIELD OF THE INVENTION

The invention relates to a high protein foodstuff that is multi-layered and methods for preparing the same.

BACKGROUND OF THE INVENTION

In recent years there has been an interest in the use of dietary supplements for improved nutrition. Among the popular supplements are so-called "athletic bars" and "sports bars", which provide in some cases "quick energy" and, in other cases, the promise of increased muscle mass, improved overall strength, increased muscle definition, fat reduction, improved stamina and reduced recovery time from muscle fatigue. The quick energy bars tend to rely primarily on carbohydrates; the muscle building bars tend to emphasize protein and amino acid content. Both types usually contain vitamins, minerals and essential nutrients as well. High protein and high amino acid bars have been commercially successful among persons who are highly committed to intense training regimens, but their general appeal is somewhat limited by the texture and taste of a one-layered bar.

There has also been a surge in the popularity of so called high protein-low carbohydrate bars which utilize glycerine in lieu of carbohydrates and sugars. These bars contain about 43% by weight of protein; about 6% by weight of fat; about 17% by weight of carbohydrates, and about 17% by weight of glycerine. One problem with this type of bar is that it is difficult to manufacture. If the protein level is high, it may be common for such bars to have a short shelf life due to molding problems. For example, the moisture within the bar may not be properly absorbed, resulting in condensation outside of the bar which leads to mold formation. Also, because the amount of protein is high, it is difficult to have such a bar bind together. Accordingly, such bars have not been manufactured with multiple layers, each layer having a different flavor. For this reason, there would be an advantage to a high protein foodstuff with at least two layers and optionally a coating which could provide a similar high concentration of protein wherein the high protein foodstuff offers a variety of tastes and textures. In order not to alter or dilute the ratio of protein to other nutritional components in the core bar, the coating may also contain a high ratio of protein. Thus there is a need for a multi-layered high protein foodstuff optionally with a high protein coating or a low protein coating.

SUMMARY OF THE INVENTION

This need is satisfied, the limitations of the prior art overcome, and other benefits realized in accordance with the principles of the present invention, which relates to a high-protein foodstuff that comprises at least two layers wherein at least one of the layers comprises at least 25% of protein and wherein the high-protein foodstuff may further comprise of a high protein coating or low protein coating. The present invention is also directed to methods for making the high protein foodstuff, optionally with a high protein coating or low protein coating.

DETAILED DESCRIPTION

The high protein foodstuff of the present invention is novel because it has at least two layers and a high protein content without all of the unwanted saturated fat and sugar carbohydrates typically associated in "sports bars" and "athletic bars". Further the composition of the high protein foodstuff offers a variety of tastes and textures. The high protein foodstuff comprises protein in at least two layers and may additionally comprise (a) carbohydrates, (b) fat, (c) sweetener, and (d) flavoring agent.

A preferred embodiment of the present invention is a high protein foodstuff that comprises:
(a) more than about 25% by weight of protein;
(b) less than about 60% by weight of carbohydrates, glycerine, and polyols in combination;
(c) less than about 25% by weight of fat;
(d) less than 30% by weight of non-polyol sweetener;
(e) at least one flavoring agent; and
(f) wherein the foodstuff comprises at least two layers, at least one of the layers comprising at least about 25% protein.

A second preferred embodiment of the present invention is a high protein foodstuff that comprises:
(a) more than about 25% by weight of protein;
(b) less than about 60% by weight of carbohydrates, glycerine, and polyols in combination;
(c) less than about 25% by weight of fat;
(d) less than 30% by weight of non-polyol sweetener wherein the non-polyol sweetener comprises less than 10% by weight of sugar;
(e) at least one flavoring agent; and
(f) wherein the foodstuff comprises at least two layers, at least one of the layers comprising at least about 25% protein.

A third preferred embodiment of the present invention is a high protein foodstuff that comprises:
(a) more than about 25% by weight of protein;
(b) less than about 60% by weight of carbohydrates, glycerine, and polyols in combination;
(c) less than about 25% by weight of fat;
(d) less than 30% by weight of non-polyol sweetener wherein the non-polyol sweetener comprises less than 5% by weight of sugar;
(e) at least one flavoring agent; and
(f) wherein the foodstuff comprises at least two layers, at least one of the layers comprising at least about 25% protein.

The high protein foodstuff should have more than about 25% by weight of protein. More preferable protein percentages may be between about 25% to about 100% by weight; about 25% to about 90% by weight; about 25% to about 85% by weight; about 25% to about 80% by weight; about 25% to about 75% by weight; about 25% to about 70% by weight; about 25% to about 65% by weight; about 25% to about 60% by weight; about 25% to about 55% by weight; about 25% to about 50% by weight; about 25% to about 45% by weight; about 25% to about 40% by weight; about 25% to about 35% by weight; about 25% to about 30% by weight; about 25% to about 29% by weight; about 30% to about 35% by weight; about 30% to about 40% by weight; about 30% to about 45% by weight; about 30% to about 50% by weight; about 30% to about 55% by weight; about 30% to about 60% by weight; about 30% to about 65% by weight; about 30% to about 70% by weight; about 30% to about 75% by weight; about 30% to about 80% by weight; about 30% to about 85% by weight; about 30% to about 90% by weight; about 30% to about 95% by weight; about 30% to about 99% by weight; about 30% by weight; about 35% by weight; about 40% by weight; about 45% by weight; about 50% by weight; about 55% by weight; about 60% by weight; about 65% by weight; about 70% by weight; about 75% by weight; about 80% by weight; about 85% by weight; about 90% by weight; about 95% by weight.

The high protein foodstuff should have less than about 60% by weight of carbohydrates, polyols, and glycerine in combination. More preferable carbohydrate, polyols, and glycerine in combination percentages may be between about 10% to about 60% by weight; about 10% to about 55% by weight; about 10% to about 50% by weight; about 10% to about 45% by weight; about 10% to about 40% by weight; about 10% to about 35% by weight; about 10% to about 30% by weight; about 10% to about 25% by weight; about 10% to about 20% by weight; about 10% to about 15% by weight; about 20% to about 60% by weight; about 20% to about 55% by weight; about 20% to about 50% by weight; about 20% to about 45% by weight; about 20% to about 40% by weight; about 20% to about 30% by weight; about 20% to about 25% by weight; about 30% to about 55% by weight; about 30% to about 50% by weight; about 30% to about 45% by weight; about 30% to about 40% by weight; about 30% to about 35% by weight; about 60% by weight; about 55% by weight; about 50% by weight; about 45% by weight; about 40% by weight; about 35% by weight; about 30% by weight; about 25% by weight; about 20% by weight; about 15% by weight; about 10% by weight; about 5% by weight; about 1% by weight.

The high protein foodstuff should have less than 25% by weight of fat. More preferable fat percentages may be between about 1% to about 25% by weight; about 1% to about 15% by weight; about 1% to about 10% by weight; about 1% to about 5% by weight; about 5% to about 25% by weight; about 5% to about 15% by weight; about 5% to about 10% by weight; about 10% to about 25% by weight; about 10% to about 15% by weight; about 12% to about 15% by weight; about 13% to about 15% by weight; about 15% to about 25% by weight; about 17% to about 25% by weight; about 20% to about 25% by weight; about 22% to about 25% by weight; about 25% by weight; about 20% by weight; about 16% by weight; about 14% by weight; about 12% by weight; about 10% by weight; about 8% by weight; about 6% by weight; about 4% by weight; about 2% by weight; about 0% by weight.

The high protein foodstuff should further comprise a non-polyol sweetener having less than 30% by weight of the foodstuff. More preferable non-polyol sweetener percentages may be between about 1% to about 30% by weight; about 0% to about 15% by weight; about 0% to about 10% by weight; about 0% to about 5% by weight; about 3% to about 30% by weight; about 3% to about 15% by weight; about 3% to about 10% by weight; about 3% to about 5% by weight; about 5% to about 30% by weight; about 5% to about 15% by weight; about 5% to about 10% by weight; about 5% to about 7% by weight; about 10% to about 30% by weight; about 10% to about 25% by weight; about 10% to about 20% by weight; about 10% to about 15% by weight; about 15% to about 30% by weight; about 15% to about 25% by weight; about 15% to about 20% by weight; about 20% to about 30% by weight; about 20% to about 25% by weight; about 25% to about 30% by weight; about 27% to about 30% by weight; about 0% to about 4% by weight; about 0% to about 3% by weight; about 0% to about 2% by weight; about 0% to about 1% by weight; about 0.5% to about 4% by weight; about 0.5% to about 3% by weight; about 0.5% to about 2% by weight; about 0.5% to about 1% by weight; about 1% to about 4% by weight; about 1% to about 3% by weight; about 1% to about 2% by weight; about 1% to about 1.5% by weight; about 0%; about 1%; about 2%; about 3%; about 4%; about 5%; about 20% by weight; about 24% by weight; about 27% by weight; about 30% by weight.

The non-polyol sweetener may further comprise less than 10% by weight of sugar. More preferable sugar percentages as part of the non-polyol sweetener may be between about 0% to about 10% by weight; about 2% to about 10% by weight; about 4% to about 10% by weight; about 6% to about 10% by weight; about 8% to about 10% by weight; about 9% to about 10% by weight; about 0% to about 8% by weight; about 0% to about 6% by weight; about 0% to about 4% by weight; about 0% to about 2% by weight; about 0% to about 1% by weight; about 5% to about 10% by weight; about 5% to about 8% by weight; about 8% to about 10% by weight; about 8% to about 9% by weight; about 10% by weight; about 9% by weight; about 8% by weight; about 7% by weight; about 6% by weight; about 5% by weight; about 4% by weight; about 3% by weight; about 2% by weight; about 1% by weight; about 0% by weight.

Alternatively, the non-polyol sweetener may further comprise less than 5% by weight of sugar. More preferable sugar percentages as part of the non-polyol sweetener may be between about 0% to about 5% by weight; about 1% to about 5% by weight; about 2% to about 5% by weight; about 3% to about 5% by weight; about 4% to about 5% by weight; about 0% to about 1% by weight; about 0% to about 2% by weight; about 0% to about 3% by weight; about 0% to about 4% by weight; about 1% to about 4% by weight; about 2% to about 4% by weight; about 3% to about 4% by weight; about 1% to about 3% by weight; about 2% to about 3% by weight.

In one embodiment the high protein foodstuff may further comprise a coating. In order not to alter or dilute the ratio of protein to other nutritional components in the core bar, the coating may also contain a high ratio of protein. Generally, the coating comprises four principal nutritive elements: (a) protein, (b) fat, (c) polyol, and (d) carbohydrates. Polyols (also known as sugar alcohols) are employed in place of simple sugars and other true carbohydrates because the polyols are slowly metabolized and do not cause a sharp rise in blood glucose following their ingestion. In order to stabilize the emulsion of the four principal ingredients it is useful to employ an emulsifier such as lecithin. A sweetener is added to improve the appeal of the product and a natural or artificial flavoring agent may be added for the same purpose. The amounts of these two ingredients are varied according to taste. The principal flavor is derived in one preferred embodiment from cocoa and in the other from yogurt, but additional flavors, such as fruit flavors (e.g. strawberry, banana, cherry, plum, raspberry, lemon, orange, lime, pineapple, blueberry, etc.), peanut butter, coffee flavor, hazelnut paste, cremes, mint, cheesecake, granola, coconut, and almonds and the like may also be used. In the case of the formulation with yogurt powder, it may be advantageous for esthetic reasons to add a white pigment, such as titanium dioxide. Minor amounts of fillers, extenders, dietary fiber, vitamins, minerals and the like may be added, as known in the art, without altering the fundamental nature of the invention.

In one embodiment the high protein foodstuff further comprises a coating wherein the coating comprises:

(a) from 200 to 500 parts by weight of protein;
(b) from 250 to 400 parts by weight of vegetable oil;
(c) from 250 to 350 parts by weight of polyol;
(d) from 3 to 6 parts by weight of an emulsifier;
(e) a sweetener; and
(f) a flavoring agent.

In other embodiments, the high protein foodstuff further comprises a coating wherein the coating comprises:
(a) from 300 to 400 parts by weight of protein;
(b) from 280 to 350 parts by weight of vegetable oil;
(c) from 250 to 350 parts by weight of polyol;
(d) from 3 to 6 parts by weight of an emulsifier;
(e) from ½ to 5 parts by weight of a sweetener; and
(f) from 30 to 70 parts by weight of cocoa or yogurt powder. The cocoa and yogurt foodstuffs may additionally contain ½ to 5 parts by weight of a natural or artificial flavoring agent, such as vanillin, and, in the case of the formulation with yogurt powder, ½ to 5 parts by weight of a white pigment, such as titanium dioxide.

In two alternative embodiments, the high protein foodstuff further comprises a coating wherein the coating comprises:
(a) from 300 to 400 parts by weight of protein;
(b) from 280 to 350 parts by weight of palm kernel oil;
(c) from 250 to 350 parts by weight of maltitol;
(d) from 3 to 6 parts by weight of a lecithin;
(e) from ½ to 5 parts by weight of a sweetener; and
(f) from 30 to 70 parts by weight of cocoa or yogurt powder. The cocoa and yogurt foodstuffs may additionally contain ½ to 5 parts by weight of a natural or artificial flavoring agent, such as vanillin, and, in the case of the formulation with yogurt powder, ½ to 5 parts by weight of a white pigment, such as titanium dioxide.

Suitable sources of proteins in the present invention may include proteins derived from milk, whey protein, hydrolyzed beef protein, casein and salts thereof Other preferred proteins may include peanut protein, wheat protein, egg protein, leptin, and vegetable proteins such as soy protein. The hydrolyzed beef protein may be bovine bone gelatin.

Preferable carbohydrates, for fast energy in the present invention may include glucose, fructose, galactose, sucrose, lactose, and maltose. Other carbohydrates may include starches, glycogen, fibers, cellulose, beta glucan, pectin, and guar gum.

The terms "sugar" and "sugars" as used herein has the general meaning as interpreted by those of ordinary skill in the art. Sugar may be interpreted as referring to any sweet, crystalline, simple carbohydrate which is an aldehyde or ketone derivative of a polyhydric alcohol. Suitable sugars may include glucose, fructose, galactose, sucrose, lactose, and maltose.

Fats provide long term energy. Fats useful in the present invention include cocoa butter, milk fat, vegetable oil, hydrogenated vegetable oils such as hydrogenated palm oil, hydrogenated shea oil, hydrogenated cottonseed oil, hydrogenated coconut oil, hydrogenated corn oil, hydrogenated soybean oil, and hydrogenated peanut oil; caprocaprylbehenin; monounsaturated fats such as olive oil and canola oil, sunflower and safflower oils; fish and marine fats. Fats containing linoleic and linoleic esters have nutritionally desirable features. Polyols are sugar alcohols. The polyols of the present invention may include hydrogenated isomaltulose, maltitol, sorbitol, lactitol, erythritol, mannitol, xylitol, and polydextrols. Glycerine might, under certain definitions, be included among the polyols, but for the purpose of the present invention, we classify it separately.

The sweeteners may be added to improve or alter the taste of the high protein foodstuff. The sweeteners of the present invention are preferably, non-nutritive sweeteners, and may include sucralose, aspartame, saccharin, and acesulfame potassium. Other sweeteners may include neohesperidin dihydrochalcone, glycyrrhizin, thaumatin, alitame, and stevioside.

The flavoring agent may be preferably cocoa or yogurt, which may be in combination with vanillin or vanilla extract. Other preferred flavoring agents may include peanut butter, mint, cheesecake, hazelnut paste, almonds, granola, coconut, strawberry, banana, cherry, plum, raspberry, lemon, orange, lime, pineapple, blueberry and other fruit flavors, coffee, or cremes and jellies.

The high protein foodstuff of the invention may further comprise a coating that is primarily intended to be employed as a chocolate, yogurt, or any other flavor coating on the present invention, and it possesses the necessary characteristics for such a use. However, the coating is not restricted to such uses. For example, it could be used in place of a traditional confectioner's coating in formulating the bulk of a high protein bar along the lines outlined in U.S. Pat. No. 4,859,475, which is incorporated herein by reference, and could even be used alone as a chocolate-like confection.

The two preferred embodiments of the coating of the present invention comprise:
(a) from 30 to 40 weight % of milk protein isolate;
(b) from 28 to 35 weight % of partially hydrogenated palm oil;
(c) from 25 to 35 weight % of maltitol;
(d) from 0.3 to 0.6 weight % of lecithin;
(e) from 0.05 to 0.2 weight % of sucralose;
(f) from 3.5 to 6.5 weight % of cocoa, processed with alkali; and
(g) from 0.05 to 0.4 weight % of vanilla.

The second comprises:
(a) from 30 to 40 weight % of milk protein isolate;
(b) from 28 to 35 weight % of partially hydrogenated palm oil;
(c) from 25 to 35 weight % of maltitol;
(d) from 0.3 to 0.6 weight % of lecithin;
(e) from 0.05 to 0.2 weight % of sucralose;
(f) from 3.5 to 6.5 weight % of nonfat yogurt powder; and
(g) from 0.05 to 0.4 weight % of titanium dioxide.

Although the coating is susceptible to embodiment in many different forms, preferred embodiments of the coating are shown. It should be understood, however, that the present disclosure is to be considered as an exemplification of the principles of the coating and is not intended to limit the coatings to the embodiments illustrated.

EXAMPLE 1

Chocolate Coating

In a heated kettle are combined 30 kg of maltitol, 125 g of sucralose and 225 g of vanilla extract. The mixture is heated to 38–44° C. and 450 g of soy lecithin is added. In a second heated kettle 32 kg of hydrogenated palm kernel oil is brought to 38–44° C. When completely liquified, it is added to the contents of the first kettle with stirring. To this mixture are added 35 kg of milk protein isolate and 5 kg of cocoa. The resulting mixture is mixed at 38–44° C. for 20 to 30 minutes until uniform and smooth. The mixture may be cooled and stored as is in large blocks or applied to the substrate bar at 38–44° C. to produce a coated bar as the final product.

EXAMPLE 2
Yogurt Coating

In a heated kettle are combined 30 kg of maltitol and 125 g of sucralose. The mixture is heated to 38–44° C. and 450 g of soy lecithin is added. In a second heated kettle 32 kg of hydrogenated palm kernel oil is brought to 38–44° C. When completely liquified, it is added to the contents of the first kettle with stirring. To this mixture are added 35 kg of milk protein isolate, 5 kg of dried yogurt and 225 g of titanium dioxide The resulting mixture is mixed at 38–44° C. for 20 to 30 minutes until uniform and smooth. The mixture may be cooled and stored as is in large blocks or applied to the substrate bar at 38–44° C. to produce a coated bar as the final product.

The high protein foodstuff of the present invention may be made by (a) providing a first layer of foodstuff comprising at least 25% protein; (b) providing a second layer of foodstuff; (c) layering said first and second layers of foodstuff together; wherein the high protein foodstuff comprises: (a) more than about 25% by weight of protein; (b) less than about 60% by weight of carbohydrates, polyols, and glycerine in combination; (c) less than about 25% by weight of fat; (d) less than 30% by weight of a non-polyol sweetener; and (e) wherein said foodstuff comprises at least two layers, at least one of said layers comprising at least about 25% protein. In one particularly preferred embodiment, the method of preparing a high protein foodstuff further comprises (a) extruding the layers in at least two sheets; (b) superimposing one layer upon another layer; (c) running the superimposed layers through one or more cutters to an exact bar width; (d) running the superimposed layers through a guillotine; (e) cutting the multi-layered high protein foodstuff to a specified length; (f) cutting the multi-layered high protein foodstuff to a specified weight; and (h) coating the multi-layered high protein foodstuff in an enrober to a specific finished weight. In an alternative preferred embodiment, the method of preparing a high protein foodstuff further comprises (a) extruding at least two layers as strips; (b) guillotining the strips to a specified weight; and (c) coating the bars to a specific weight.

The high protein foodstuff comprises at least two layers wherein at least one of the layers comprises at least 25% of protein. The following are preferred embodiments of the high protein foodstuff. It should be understood that the present disclosure is not intended to limit the high protein foodstuff to the embodiments illustrated. The high protein foodstuff may have any number of layers with a wide variety of flavors.

EXAMPLE 1

A preferred embodiment of the present invention with a high protein coating or low protein coating may have about a 56 gram base that comprises:

(a) about 10 grams of hydrolyzed beef protein;
(b) about 7 grams of calcium caseinate protein;
(c) about 3.6 grams of whey protein isolate;
(d) about 2 grams of soy protein isolate;
(e) about 11.5 grams of glycerine;
(f) about 2.5 grams of water;
(g) about 0.03 grams of sucralose;
(h) about 0.09 grams of a vitamin blend;
(i) about 2.5 grams of maltitol;
(j) about 4–6 grams of specific bar flavor;
(k) about 6 grams coating (about 30% fat, about 40% carbohydrates, about 20% protein); and
(l) about 0.002 potassium sorbate.

EXAMPLE 2

Chocolate and peanut butter two layered high protein foodstuff

To prepare a chocolate and peanut butter multi-layered high protein foodstuff, the chocolate flavored layer is prepared by mixing specified amounts of glycerine, water, maltitol, and potassium sorbate to consistency. The protein blend (bovine beef gelatin, calcium caseinate protein, whey protein isolate, and soy protein isolate) is then added to the mixture and mixed to consistency. The flavoring agent (cocoa), sucralose (or other sweetener), and vitamin blend are added to the mixture and mixed to consistency. The mixture is then allowed to sit to set up for trimming.

The peanut butter flavored layer is prepared by mixing specified amounts of glycerine, H2O, maltitol, and potassium sorbate to consistency. The protein blend (hydrolyzed protein beef bovine bone gelatin, calcium caseinate protein, whey protein isolate, and soy protein isolate) is then added to the mixture and mixed to consistency. The flavoring agent (peanut flavor), sucralose (or other sweetener), and vitamin blend are added to the mixture and mixed to consistency. The mixture is then allowed to sit to set up for trimming.

The peanut butter flavored mass and chocolate flavored mass are then placed into, for example, a dual head extruder. The layers can then be extruded in lengths or sheets and then cut to size.

The chocolate flavored layer and peanut butter flavored layer are extruded and superimposed upon one another. The superimposed layers are run through one or more cutters to an exact bar width and then run through a guillotine. The multi-layered high protein foodstuff are cut to a specified length and then cut to a specified weight. Optionally the multi-layered high protein foodstuff is coated in an enrober to a specific finished weight.

Alternatively, the extruded chocolate flavored layer and peanut butter flavored layer are guillotined to a specified weight and then coated to a specific weight.

What is claimed is:

1. A high protein foodstuff comprising:
   (a) more than about 25% by weight of protein;
   (b) less than about 60% by weight of carbohydrates, polyols, and glycerine in combination;
   (c) less than about 25% by weight of fat;
   (d) less than 30% by weight of a non-polyol sweetener;
   (e) at least one flavoring agent; and
   (f) wherein said foodstuff comprises at least two layers, at least one of said layers comprising at least about 25% protein.

2. A high protein foodstuff of claim 1 wherein said non-polyol sweetener may further comprise less than 10% by weight of sugar.

3. A high protein foodstuff of claim 1 wherein said non-polyol sweetener may further comprise less than 5% by weight of sugar.

4. A high protein foodstuff of claim 1 wherein said protein is between about 25% to about 50% by weight.

5. A high protein foodstuff of claim 1 wherein said protein is between about 25% to about 35% by weight.

6. A high protein foodstuff of claim 1 wherein said protein is about 30% by weight.

7. A high protein foodstuff of claim 1 wherein said carbohydrates, polyols, and glycerine in combination are between about 15% to about 55% by weight.

8. A high protein foodstuff of claim 1 wherein said carbohydrates, polyols, and glycerine in combination are between about 20% to about 45% by weight.

9. A high protein foodstuff of claim 1 wherein said carbohydrates, polyols, and glycerine in combination are about 45% by weight.

10. A high protein foodstuff of claim 1 wherein said fat is between about 1% to about 25% by weight.

11. A high protein foodstuff of claim 1 wherein said fat is between about 5% to about 25% by weight.

12. A high protein foodstuff of claim 1 wherein said fat is about 20% by weight.

13. A high protein foodstuff of claim 1 wherein said non-polyol sweetener is between about 0% to about 30% by weight.

14. A high protein foodstuff of claim 1 wherein said non-polyol sweetener is between about 5% to about 30% by weight.

15. A high protein foodstuff of claim 1 wherein said non-polyol sweetener is about 20% by weight.

16. A high protein foodstuff according to claim 1 wherein the non-polyol sweetener is chosen from saccharin, aspartame, acesulfame-potassium, sucralose, neohesperidin dihydrochalcone, glycyrrhizin, thaumatin, alitame, and stevioside.

17. A high protein foodstuff according to claim 1 wherein the protein is chosen from whey protein, peanut protein, soy protein, wheat protein, milk protein, leptin, egg protein, casein and salts thereof, and hydrolyzed beef protein.

18. A high protein foodstuff according to claim 1 wherein the carbohydrates, polyols, and glycerin in combination are chosen from glucose, fructose, galactose, sucrose, lactose, maltose, starches, glycogen, fibers, cellulose, beta glucan, pectin, polydextrols, and guar gum.

19. A high protein foodstuff according to claim 1 wherein the fat is chosen from cocoa butter, milk fat, hydrogenated vegetable oil, caprocaprylbehenin, olive oil, canola oil, sunflower oil, safflower oil, fish and marine fats.

20. A high protein foodstuff according to claim 1 wherein the flavoring agent is chosen from hazelnut paste, coconut, granola, almonds, vanillin or vanilla extract, strawberry, cocoa, yogurt, banana, cherry, plum, raspberry, lemon, orange, lime, pineapple, blueberry and other fruit flavors, peanut butter, mint, cheesecake, coffee, cremes, and jellies.

21. A high protein foodstuff according to claim 1 further comprising a coating.

22. The high protein foodstuff according to claim 21 wherein said coating comprises:
(a) from 200 to 500 parts by weight of protein;
(b) from 250 to 400 parts by weight of vegetable oil;
(c) from 250 to 350 parts by weight of a polyol;
(d) from 3 to 6 parts by weight of an emulsifier;
(e) a non-nutritive sweetener; and
(f) a flavoring agent.

23. The high protein foodstuff according to claim 21 wherein said coating comprises:
(a) from 300 to 400 parts by weight of protein;
(b) from 280 to 350 parts by weight of vegetable oil;
(c) from 250 to 350 parts by weight of a polyol;
(d) from 3 to 6 parts by weight of an emulsifier;
(e) from ½ to 5 parts by weight of a non-nutritive sweetener; and
(f) from 30 to 70 parts by weight of cocoa.

24. The high protein foodstuff according to claim 21 wherein said coating comprises:
(a) from 300 to 400 parts by weight of protein;
(b) from 280 to 350 parts by weight of vegetable oil;
(c) from 250 to 350 parts by weight of a polyol;
(d) from 3 to 6 parts by weight of an emulsifier;
(e) from ½ to 5 parts by weight of a non-nutritive sweetener; and
(f) from 30 to 70 parts by weight of yogurt powder.

25. The high protein foodstuff according to claim 22 wherein said protein is derived from milk.

26. The high protein foodstuff according to claim 22 wherein said protein is chosen from whey protein, peanut protein, soy protein, wheat protein, milk protein, leptin, egg protein, hydrolyzed beef protein, and casein and salts thereof.

27. The high protein foodstuff according to claim 22 wherein said vegetable oil is chosen from cocoa butter, hydrogenated cottonseed oil, hydrogenated coconut oil, hydrogenated corn oil, hydrogenated soybean oil, hydrogenated palm oil, and hydrogenated peanut oil.

28. The high protein foodstuff according to claim 22 wherein said vegetable oil is hydrogenated palm oil.

29. The high protein foodstuff according to claim 22 wherein said polyol is chosen from hydrogenated isomaltulose, maltitol, sorbitol, lactitol, erythritol, xylitol, and polydextrols.

30. The high protein foodstuff according to claim 29 wherein said polyol is maltitol.

31. The high protein foodstuff according to claim 22 wherein said emulsifier is lecithin.

32. The high protein foodstuff according to claim 22 wherein said non-nutritive sweetener is chosen from saccharin, aspartame, acesulfame-potassium, sucralose, neohesperidin dihydrochalcone, glycyrrhizin, thaumatin, alitame, and stevioside.

33. The high protein foodstuff according to claim 32 wherein said non-nutritive sweetener is sucralose.

34. The high protein foodstuff according to claim 22 comprising from ½ to 5 parts by weight of a natural or artificial flavoring agent.

35. The high protein foodstuff according to claim 34 wherein said natural or artificial flavoring agent is vanilla extract or vanillin.

36. The high protein foodstuff according to claim 23 additionally comprising from ½ to 5 parts by weight of a white pigment.

37. The high protein foodstuff according to claim 36 wherein said white pigment is titanium dioxide.

38. The high protein foodstuff according to claim 22 wherein said coating comprises:
(a) from 300 to 400 parts by weight of milk protein isolate;
(b) from 280 to 350 parts by weight of partially hydrogenated palm oil;
(c) from 250 to 350 parts by weight of maltitol;
(d) from 3 to 6 parts by weight of lecithin;
(e) from ½ to 5 parts by weight of sucralose; and
(f) from 35 to 65 parts by weight of cocoa or yogurt powder.

39. A high protein foodstuff comprising:
(a) more than about 25% by weight of protein;

(b) less than about 20% by weight of carbohydrates, polyols, and glycerine in combination;
(c) less than about 25% by weight of fat;
(d) less than 30% by weight of a non-polyol sweetener;
(e) at least one flavoring agent; and
(f) wherein said foodstuff comprises at least two layers, at least one of said layers comprising at least about 25% protein.

40. A high protein foodstuff of claim 39 wherein said protein is between about 25% to about 50% by weight.

41. A high protein foodstuff of claim 39 wherein said carbohydrates, polyols, and glycerine in combination are between about 15% to about 20% by weight.

42. A high protein foodstuff of claim 39 wherein said fat is between about 1% to about 15% by weight.

43. A high protein foodstuff of claim 39 wherein said non-polyol sweetener is between about 0% to about 20% by weight.

44. A high protein foodstuff according to claim 39 further comprising a coating.

45. A high protein foodstuff comprising:
(a) more than about 25% by weight of protein;
(b) less than about 20% by weight of carbohydrates, polyols, and glycerine in combination;
(c) less than about 25% by weight of fat;
(d) less than 30% by weight of a non-polyol sweetener,
(e) at least one flavoring agent;
(f) a coating having from 300 to 500 parts by coating weight of protein; and
(g) wherein said foodstuff comprises at least two layers, at least one of said layers comprising at least about 25% protein.

46. A high protein foodstuff of claim 45 wherein said protein is between about 25% to about 50% by weight.

47. A high protein foodstuff of claim 45 wherein said carbohydrates, polyols, and glycerine in combination are between about 15% to about 20% by weight.

48. A high protein foodstuff of claim 45 wherein said fat is between about 1% to about 15% by weight.

49. A high protein foodstuff of claim 45 wherein said non-polyol sweetener is between about 0% to about 20% by weight.

50. The high protein foodstuff according to claim 45 wherein said coating comprises:
(a) from 300 to 500 parts by weight of protein;
(b) from 250 to 400 parts by weight of vegetable oil;
(c) from 250 to 350 parts by weight of a polyol;
(d) from 3 to 6 parts by weight of an emulsifier;
(e) a non-nutritive sweetener; and
(f) a flavoring agent.

51. The high protein foodstuff according to claim 45 wherein said coating comprises:
(a) from 300 to 400 parts by weight of protein;
(b) from 280 to 350 parts by weight of vegetable oil;
(c) from 250 to 350 parts by weight of a polyol;
(d) from 3 to 6 parts by weight of an emulsifier;
(e) from ½ to 5 parts by weight of a non-nutritive sweetener; and
(f) from 30 to 70 parts by weight of cocoa.

52. The high protein foodstuff according to claim 45 wherein said coating comprises:
(a) from 300 to 400 parts by weight of protein;
(b) from 280 to 350 parts by weight of vegetable oil;
(c) from 250 to 350 parts by weight of a polyol;
(d) from 3 to 6 parts by weight of an emulsifier;
(e) from ½ to 5 parts by weight of a non-nutritive sweetener; and
(f) from 30 to 70 parts by weight of yogurt powder.

53. The high protein foodstuff according to claim 45 wherein said coating comprises:
(a) from 300 to 400 parts by weight of milk protein isolate;
(b) from 280 to 350 parts by weight of partially hydrogenated palm oil;
(c) from 250 to 350 parts by weight of maltitol;
(d) from 3 to 6 parts by weight of lecithin;
(e) from ½ to 5 parts by weight of sucralose; and
(f) from 35 to 65 parts by weight of cocoa or yogurt powder.

* * * * *

(12) INTER PARTES REEXAMINATION CERTIFICATE (0384th)
United States Patent
McCabe

(10) Number: US 6,830,766 C1
(45) Certificate Issued: Jun. 5, 2012

(54) HIGH PROTEIN FOODSTUFF

(75) Inventor: David J. McCabe, Largo, FL (US)

(73) Assignee: Protein Bar Technologies LLC, Largo, FL (US)

Reexamination Request:
No. 95/000,310, Oct. 24, 2007

Reexamination Certificate for:
Patent No.: 6,830,766
Issued: Dec. 14, 2004
Appl. No.: 10/150,263
Filed: May 18, 2002

Related U.S. Application Data

(63) Continuation-in-part of application No. 10/094,517, filed on Mar. 8, 2002, now Pat. No. 6,827,955.

(51) Int. Cl.
*A23G 1/00* (2006.01)
*A23G 1/30* (2006.01)
*A23G 1/44* (2006.01)
*A23G 3/34* (2006.01)
*A23G 9/00* (2006.01)
*A23G 9/32* (2006.01)
*A23L 1/00* (2006.01)
*A23L 1/29* (2006.01)
*A23L 1/305* (2006.01)
*A23L 1/38* (2006.01)
*A23L 1/36* (2006.01)

(52) U.S. Cl. .......... 426/89; 426/302; 426/306; 426/656; 426/93

(58) Field of Classification Search .......... None
See application file for complete search history.

(56) References Cited

To view the complete listing of prior art documents cited during the proceeding for Reexamination Control Number 95/000,310, please refer to the USPTO's public Patent Application Information Retrieval (PAIR) system under the Display References tab.

*Primary Examiner* — Evelyn Huang

(57) ABSTRACT

The present invention is a high-protein foodstuff that includes at least two layers wherein at least one of the layers includes at least 25% of protein and wherein the high-protein foodstuff may further include of a high protein coating or low protein coating. The present invention is also directed to methods for making the high protein foodstuff, optionally with a high protein coating or low protein coating.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-53 are cancelled

* * * * *